United States Patent [19]

Snelson

[11] Patent Number: 6,017,220

[45] Date of Patent: Jan. 25, 2000

[54] MAGNETIC GEOMETRIC BUILDING SYSTEM

[76] Inventor: Kenneth D. Snelson, 37 W. 12th St., Apt. 12J, New York, N.Y. 10011

[21] Appl. No.: 08/876,516

[22] Filed: Jun. 16, 1997

[51] Int. Cl.[7] .......................... G09B 23/04; G09B 23/18; A63H 33/26

[52] U.S. Cl. .............................. 434/301; 434/211; 446/92

[58] Field of Search ..................... 446/92, 129; 434/301, 434/73, 134, 168, 129, 190, 211; 148/101

[56] References Cited

U.S. PATENT DOCUMENTS

| | | | |
|---|---|---|---|
| 1,236,234 | 8/1917 | Troje | 446/92 |
| 3,077,696 | 2/1963 | Barnett et al. | 446/92 |
| 3,095,668 | 7/1963 | Dorsett | 446/92 |
| 3,196,566 | 7/1965 | Littlefield | 446/129 |
| 3,276,148 | 10/1966 | Snelson | 434/281 |
| 3,998,004 | 12/1976 | Ehrlich | 446/92 |
| 4,404,766 | 9/1983 | Toth | 446/129 |
| 4,722,712 | 2/1988 | McKenna | 446/92 |
| 5,009,625 | 4/1991 | Longuet-Higgins | 446/92 |
| 5,021,021 | 6/1991 | Ballard | 446/92 |
| 5,234,219 | 8/1993 | Lin | 273/392 |
| 5,337,501 | 8/1994 | Amanze | 40/621 |
| 5,411,262 | 5/1995 | Smith | 273/157 R |
| 5,746,638 | 5/1998 | Shiraishi | 446/92 |

FOREIGN PATENT DOCUMENTS

| | | | |
|---|---|---|---|
| 1063946 | 8/1959 | Germany | 446/92 |
| 618851 | 2/1949 | United Kingdom | 446/92 |
| 976588 | of 1964 | United Kingdom | 446/92 |

*Primary Examiner*—Gene Mancene
*Assistant Examiner*—Michael B. Priddy
*Attorney, Agent, or Firm*—Pennie & Edmonds LLP

[57] ABSTRACT

A construction kit comprising a plurality of connectable magnetic members having north and south magnetic poles on their opposite faces.

17 Claims, 3 Drawing Sheets

MAGNETIC GEOMETRIC BUILDING SYSTEM

BACKGROUND OF THE INVENTION

This invention relates to a construction useful as an educational or amusement device for building three-dimensional geometric forms. Magnetic construction systems have been used before in various ways but none has employed the combination of geometrical shape and the bipolar magnetic force so economically as in the present invention. Other, prior art, magnetic geometrical construction systems have comprised polyhedra or polygons of wood or plastic into which are embedded numbers of small individual magnets for linking the separate elements through north and south magnetic attraction.

A different type of structure is described in my earlier U.S. Pat. No. 3,276,148, entitled "Model for Atomic Forms", which is concerned with groupings of circle-shape flat magnets supported on nonmagnetic armatures to form spherical mosaics of magnetic fields. In that earlier patent wherein the magnets connect one to the next by edge-to-edge antiparallel attraction, the configurations of magnets can become stable structures only with the help of non-magnetic armatures, both to support the weight of the magnets as well as to hold them in their proper relationships.

SUMMARY OF THE INVENTION

The present invention uses single, generally planar, magnetic members with north on one side and south on the other, associated edge-to-edge, north linked to south. The magnetic members are made of flexible or ceramic magnetic material. The individual construction members are fabricated in the shapes of flat, equilateral, polygons; triangles, squares, pentagons and hexagons. They can be assembled in various combinations to form firm space. Frames of great variety and which do not require supporting armatures for their stability. Putting together the magnets one by one to assemble the composite magnet forms can be challenging because the stability of the figures is achieved only as the final elements are included. Collapses are frequent, especially with the novice who is leaning the simple but hazardous technique. This aspect of the invention has similarities to pick-up-sticks or other amusements which require careful skill and hand control.

DETAILED DESCRIPTION OF THE INVENTION

Figure 1:
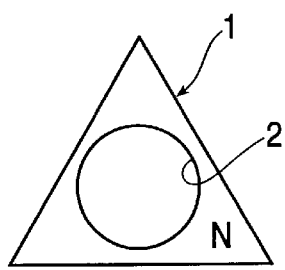
FIG. 1 is a plan view of a magnet constructed according to the present invention.
Figure 2:
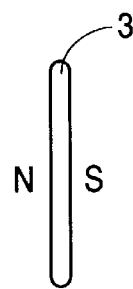
FIG. 2 is a side view of the magnet shown in FIG. 1.

FIG. 1 shows a triangular shaped magnet member 1 in plan view. In this construction, the center of the magnet has been removed to form a circular opening 2. FIG. 2 shows an edge of the triangle 1 which separates the opposite faces. The magnetic field's orientation, north on one face and south on the other, is shown in FIG. 2. The north and south sides are designated in FIG. 2, and all other figures, by N and S. As shown here, the edges 3 of the triangular magnet member have been rounded to optimize the surface contact between adjacent construction members. Although a smooth curved edge is shown, the curved shape can be formed of two, three or more flat surfaces, as shown, for example, in FIG. 7.

Figure 3:
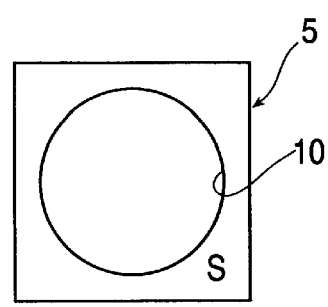
FIGS. 3–6 are plan views of different shaped magnets of the present invention.
Figure 4:
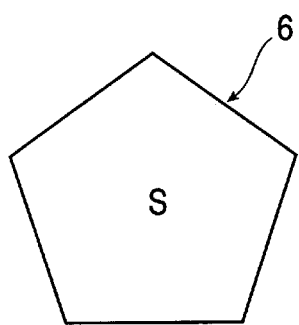
Figure 5:
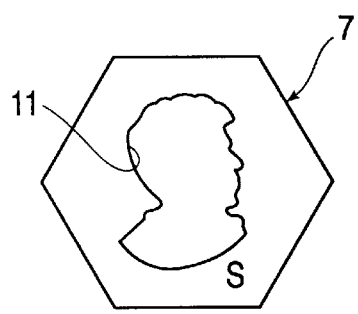
Figure 6:
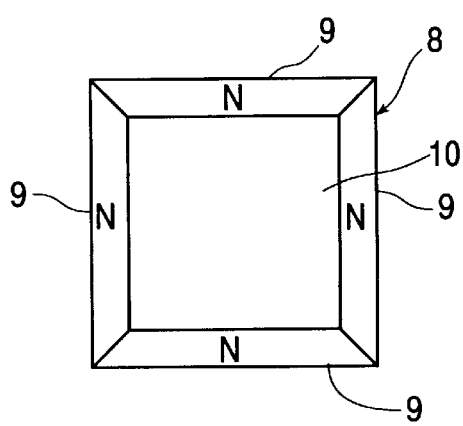

FIGS. 3–5 show the three other different shaped magnetic members of the invention: a square 5, a pentagon 6 and a hexagon 7, respectively. FIG. 6 shows a framed member 8. The framed member includes four magnetic peripheral sections 9 surrounding a center panel section 10 which is plastic or some other non-magnetic material. The peripheral sections 9 have edges separating their opposite faces. The inner edges are adhesively attached to the edge of the central section. The north pole of each peripheral section faces in the same direction. However, any tendency of the corners of the peripheral sections 9 to repel each other is overcome by the adhesive connection to the central panel section.

For the most useful combinations of linkages, all edges 3 of the several shapes are of the same length. The shapes in the structures of FIGS. 1, 3 and 5 have perforated faces defining openings 2, 10 and 11, of different shapes. The constructions are enhanced by reducing the effect of gravity so that removing a middle area in the polygons reduces weight and also makes a more economical use of material.

Figure 7:
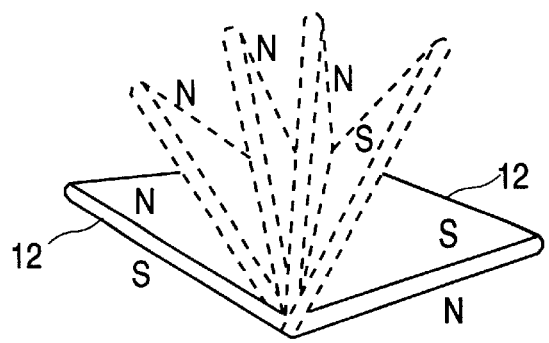
FIG. 7 is a perspective view showing two magnets connected together.

FIG. 7 illustrates a face-to-face parallel magnetic attachment of two triangle shaped magnetic members 12. Their polarities are oriented in the same direction. When hinged open like a book they continue to bond together by their edges, but with poles facing in opposite directions, there is a magnetic antiparallel association.

Figure 8:
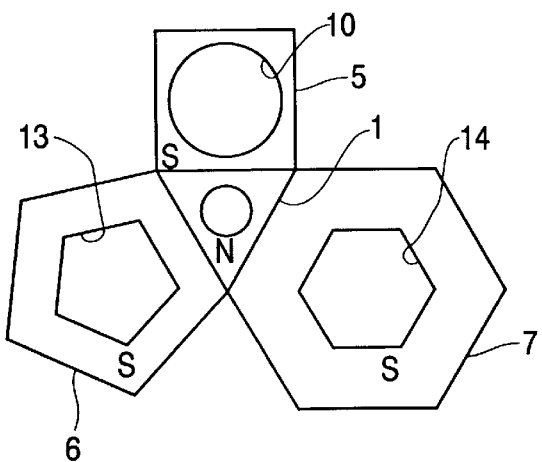
FIG. 8 is a plan view showing a number of magnets connected together.

FIG. 8 shows a flat grouping of four magnetic members, a square 5, a pentagon 6, and a hexagon 7, with openings 10, 13 and 14, respectively. The magnets are magnetically attached to the edges of a central triangular magnet. The polarity of the different magnets is designated by N and S.

Figure 9:
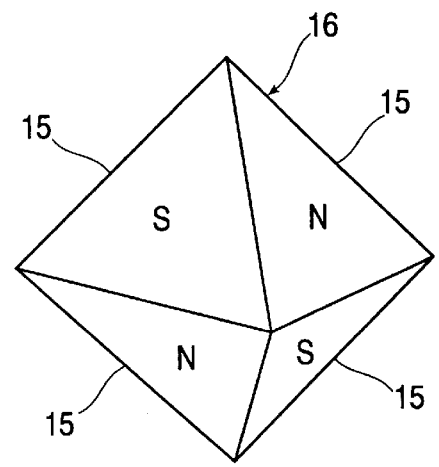
FIGS. 9–15 are perspective views showing different constructions made with individual magnets in accordance with the present invention.

FIG. 9 shows eight triangle shaped magnetic members 15 with polarities alternated over the surface of the structure to form a stable, self-supporting, octahedron 16. Four of the magnets are hidden from view.

Figure 10:
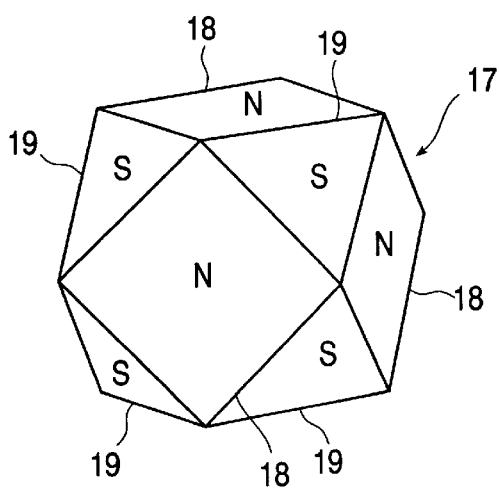

FIG. 10 shows an Archimedean polyhedron 17, known as cubo-octahedron, composed of six square magnetic members 18 plus eight equilateral triangles 19. Again, half of the magnets are hidden from view. Though the figure here shows the square magnets 18 with their north poles on the exterior and the eight triangular magnets 19 with their south poles on the exterior, they can be constructed equally well with all polarities of squares and triangles reversed.

Figure 11:
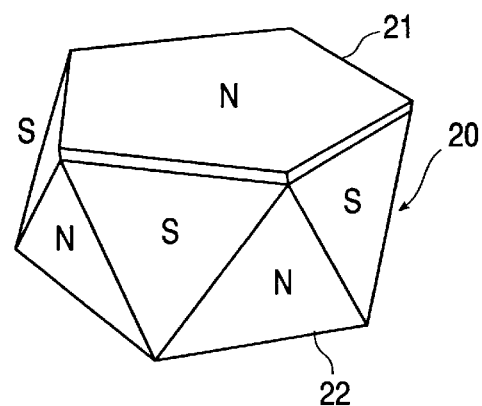

FIG. 11 shows a pentic antiprism 20 composed of two pentagon magnetic members 21 and ten triangle magnetic members 22.

Figure 12:
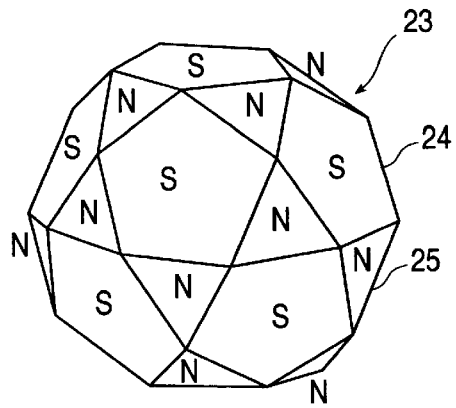

FIG. 12 shows another Archimedean polyhedron 23 known as an icosidodecahedron composed of twelve equilateral pentagons 24 and twenty equilateral triangles 25. In this figure too, the magnetic relationships are reversible.

Figure 13:
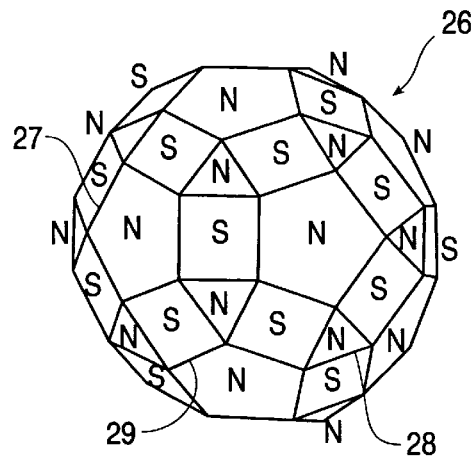

FIG. 13 shows another Archimedean form 26 known as the small rhombicosidodecahedron composed of twelve pentagonal magnetic members 27, twenty triangular magnetic members 28 and thirty square magnetic members 29.

Figure 14:
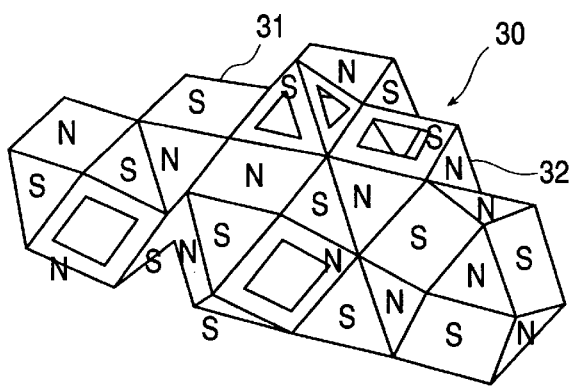

FIG. 14 shows a complex structure 30 using many squares 31 and triangles 32.

Figure 15:
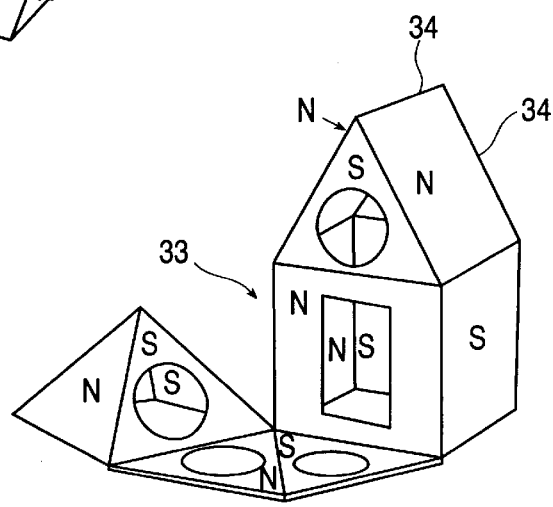

FIG. 15 shows a small "house" construction 33. The two, square, slanted roof members 34, one of which is shown, are not linked at the top edges 34 with an attracting antiparallel connection, yet the configuration as a whole has a sufficient overall antiparallel connections to overcome the repelling adjacent edges of the two square "roof" magnets.

Although a limited number of polygon shapes have been shown, it is understood that other shapes can be used. Also, instead of cutting holes through the magnets, they may be of a thinner thickness to reduce weight. Other modifications of the construction shown, can be made without departing from the invention as claimed.

I claim:

1. A construction kit comprising:

a plurality of magnets, each magnet having:
a pair of substantially planar faces each of which have a homogenous magnetic polarity; and
a plurality of edges defining said faces,
wherein a plurality of at least four magnets are present, with the magnets, by themselves, used for forming an exterior surface of a three-dimensional structure by being magnetically attached to each other only along said edges, and, when magnetically attached to each other form alternating, checkerboard-like magnetic polarities on the exterior surface of the three-dimensional structure.

2. A construction kit according to claim 1 wherein the edges of each magnet are of substantially the same length.

3. A construction kit according to claim 1 wherein the magnets have perforations through at least some of the faces of the magnets.

4. A construction kit according to claim 1, wherein at least some of the magnets have edges of the same length, and all of the edges have substantially identical thicknesses.

5. A construction kit according to claim 1, wherein the magnets are polygon-shaped to form a polyhedron.

6. A construction kit according to claim 1 wherein at least eight magnets are present and the edges of each magnet are rounded.

7. A construction kit according to claim 1 wherein the plurality of magnets include at least two different polyhedron shaped magnets.

8. A three dimensional structure having an exterior surface comprising a plurality of magnets, each magnet having a pair of substantially planar faces each of which has a homogenous magnetic polarity and a plurality of edges defining said face, with the magnets, by themselves, being magnetically attached to each other only along said edges and to form alternating checkerboard-like magnetic polarities on the exterior surface of the structure.

9. The structure of claim 8 wherein at least some of the magnets have edges of the same length, and all of the edges of each magnet have substantially identical thicknesses.

10. The structure of claim 8 wherein at least some of the magnets are polygon-shaped.

11. The structure of claim 3 wherein the magnets are joined to form a polyhedron.

12. The structure of claim 8 wherein at least some of the magnets have perforations through the planar faces.

13. The structure of claim 8 wherein the edges of each magnet are of substantially the same length.

14. The structure of claim 8 wherein at least four magnets are present and the edges of each magnet are rounded.

15. The structure of claim 10 wherein the plurality of magnets include at least two different polyhedron shaped magnets.

16. The structure of claim 15 wherein at least eight magnets are utilized to form the structure.

17. The structure of claim 10 wherein at least eight magnets are utilized to form the structure.

* * * * *